May 4, 1965  J. G. JACKSON, JR  3,181,552
VALVES WITH ENHANCED PRESSURE ACTUATED SEALS
Filed Sept. 26, 1961  2 Sheets-Sheet 1
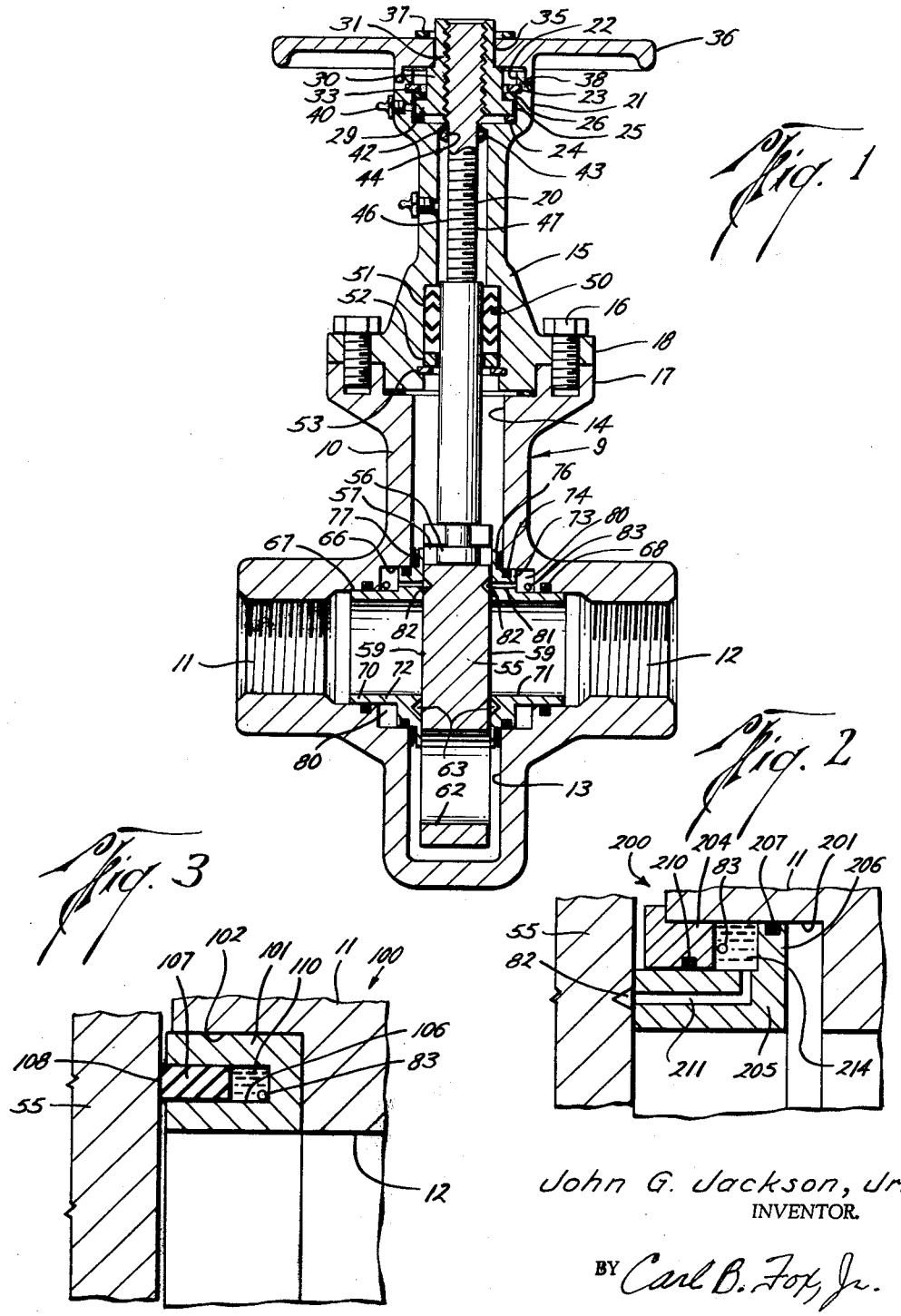
John G. Jackson, Jr.
INVENTOR.
BY Carl B. Fox, Jr.
ATTORNEY

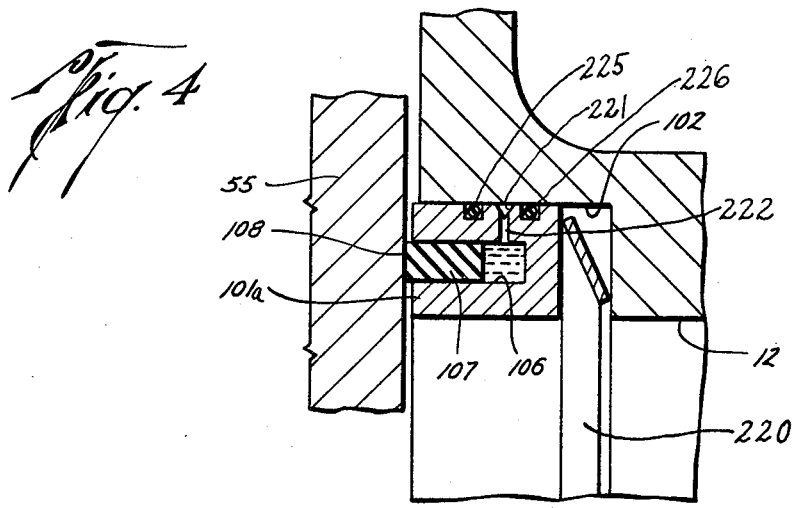
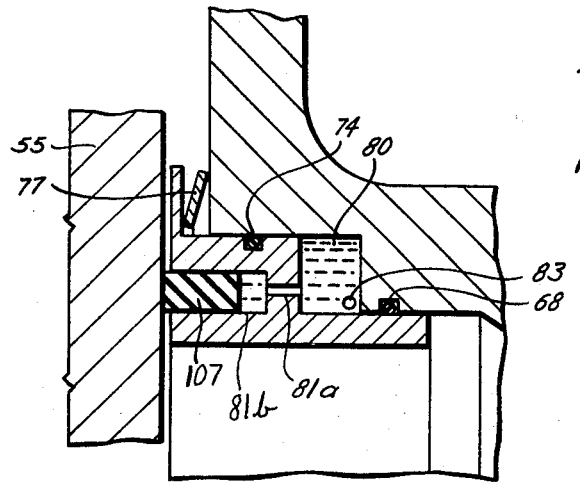

United States Patent Office 3,181,552
Patented May 4, 1965

3,181,552
VALVES WITH ENHANCED PRESSURE
ACTUATED SEALS
John G. Jackson, Jr., Angleton, Tex., assignor to McEvoy
Company, Houston, Tex., a corporation of Texas
Filed Sept. 26, 1961, Ser. No. 140,929
4 Claims. (Cl. 137—246.12)

This invention pertains to valves of the automatic sealing type. Distinguishing the valves of this invention from other automatic sealing valves, particularly of the gate type, the valves hereby presented provide sealing systems wherein the plastic or other flowable sealing material used to effect the seals is pressured to a degree greater than in other valves of this type. In the past, it has been common to effect seals with pressured sealing means wherein the sealing means are pressured to the pressure of the high-pressure fluid at one side of the valve when the valve is closed. In this valve, however, the sealing means is pressured to a greater degree so that not only are more effective seals realized, but provision is had for freeing valves wherein failure to seal has been encountered.

A principal object of the invention is to provide automatic sealing of simpler form than has been provided in the past.

An additional object of the invention is to provide a plastic or other automatic sealing valve wherein pressure of the sealant is in excess of the pressures to be sealed.

Another principal object of the invention is to provide automatic sealing gate valves wherein the sealant supply is of simplified form and is reliable and of low cost to provide in the valves.

Briefly, the valves provided by this invention provide a novel sealant or grease reservoir which is formed between the seat elements of the valve and the valve body. Pressure internally of the valve acting on the seat elements pressures the reservoir to any predetermined degree, depending upon the design of the valve. Since the sealing pressure can be preselected with relation to the pressures for which the valve is designed, sealing of the degree necessary may be provided in every case, and in case of severe service higher sealing pressures may be provided to take care of the possibility of leaks.

Other objects and advantages of the invention will appear from the following detail description, reference being made to the accompanying drawings of which:

FIGURE 1 is a vertical cross sectional view of a preferred form of valve according to the invention, taken along the axis of the stem of the valve;

FIGURE 2 is a partial vertical cross sectional view, enlarged, showing a modified sealant reservoir adapted for "upstream" sealing;

FIGURE 3 is an enlarged partial vertical cross sectional view showing another modification of the sealing assembly;

FIGURE 4 is an enlarged partial vertical cross sectional view showing a modification of the form of the invention shown in FIGURE 3; and, FIGURE 5 is an enlarged partial vertical cross sectional view showing a modification of the form of the invention shown in FIGURE 1.

Referring now to the drawings in detail, and first to FIGURE 1, valve 9 has a valve body 10 through which are provided flow passages 11, 12 disposed with their axes in alignment to form a continuous flow passage through the valve. Centrally within the valve body there is formed a valve chamber 13 which passages 11, 12 enter from opposite sides thereof. Valve chamber or cavity 13 opens to the exterior of the body at one side of the body commonly termed the bonnet side. The bonnet opening is designated by reference numeral 14. The bonnet opening of the valve body is closed by a bonnet 15 which is bolted around its periphery to the valve body by a plurality of bolts 16 which are screwed into suitable tapped openings in an upper flange 17 of the valve body, the bonnet being suitable perforated to receive bolts therethrough in a flange 18. Above flange 18, bonnet 15 is tubular and of reduced diameter and has an axial opening therethrough through which the valve stem 20 is received. Within an upper enlargement 21 of the bonnet, there is a recess or counterbore 22 around which a snap ring groove 23 is formed. Bearing members 24, 25, 26 are disposed in recess 22 around lower flange 29 of a turning sleeve 30 which is interiorly threaded to receive exterior threads 31 of stem 20. A snap ring 33 in groove 23 holds the bearings 24–26 in place and also holds the turning sleeve secured against movement out of the recess but capable of being turned or rotated therein. Turning sleeve 30 has an upwardly extending portion 35 of smaller exterior diameter which extends upwardly beyond and through hand wheel 36, a snap ring 37 in a suitable groove around the upper end of portion 35 of sleeve 30 holding the hand wheel in place. Hand wheel 36 has a downwardly extending flange 38 slidingly received in a corresponding recess around the upper end of the bonnet. Grease fitting 40 through the side of the bonnet at the location of the bearings provides for lubrication of the bearings. When hand wheel 36 is rotated, stem 20 which is fixed against rotation is caused to move upwardly or downwardly depending upon the direction of rotation of the hand wheel.

A pair of pins 42, 43, each having a flattened side portion 44 toward shaft or stem 20, are positioned in suitable perforations through the bonnet wall. Stem 20 has flattened sides 46, 47 which are engaged against the flattened sides of the pins. The pins and flattened sides of the stem prevent rotation of the stem while at the same time not interfering with the stem threads at that portion of the stem so that the stem may be drawn upwardly by the threads of sleeve 30 to above sleeve 30. The longitudinal extent of the flats 46, 47 of the stem is such that the upper end of each flat will strike the pin when the stem is down as far as it must move to close the valve and so that the lower end of the flats coincides with the upper limit of travel of the stem.

Below the lowermost ends of flats 46, 47, when the valve is closed with the stem moved downwardly, there is within the bonnet opening an enlargement 50 serving to contain packing rings 51. The portion of stem 20 having flats 46, 47 never moves to within the packing 51. A retainer ring 52 and snap ring 53 retain the packing in place within the bonnet opening.

Stem 20 is joined at its lower end with the gate 55 by a T-shaped portion 56 at the lower end of the stem which is freely received in a T-shaped slot in the end of the bonnet, the slot being designated by reference numeral 57. The T-shaped formation 56 at the end of the step is of circular form consistent with the bar stock of which the stem was manufactured. The T-slot in the end of the gate is rectilinearly formed across the width of the gate. When stem 20 is moved upwardly (without rotating) by rotation of hand wheel 36 which is keyed to sleeve 30, gate 55 is moved upwardly or downwardly to open or to close the valve. Gate 55 is of flat-plate form having imperforate sealing plate areas 59 suitable for closing passages 11, 12 and a port 62 therethrough alignable with passages 11, 12, to provide a continuous flow passage through the valve.

Partially around the face of each seat, at each side of the gate, there is formed an arc-shaped sealing groove 63. Each of the valve body passages 11, 12 is threaded at its outer end to provide for connection of a flow conduit such as a threaded pipe.

Around each of the flow passages 11, 12, there is formed a relatively larger recess or counterbore 66 and a relatively smaller recess or counterbore 67, the larger counterbore being adjacent valve chamber 13 and the smaller counterbore being spaced from chamber 13 by the larger counterbore. An O-ring 68 in a recess suitably provided around the smaller counterbore provides a seal with the seat member, to be described.

Each seat member 70 is of generally ring shape, having an axial port 71 therethrough usually of the same size as the passages 11, 12, and being of stepped outer form. The smallest terminal portion of each seat referred to by reference numeral 72 is slidingly receivable through O-ring 68 and in counterbore 67. The intermediate portion 73 of each seat is slidably movable within the larger counterbore 66 of the seat recess. An O-ring 74 is provided in a suitable groove around the intermediate portion of each seat. A thin flange-like portion 76 of each seat extends along the wall within the valve chamber and has therebehind a Belleville-type spring 77 so that each seat is urged toward the gates by such spring. The seat portion 73 is of shorter length than is the larger counterbore 66 so that a reservoir space 80 is provided within the larger counterbore and between the two O-ring seals 68 and 74. One or more ports 81 through the seat extends from the reservoir space to the seating face of the seat.

A sealing groove 82 in each of the gate faces extends part way around the port 71 of each seat when the valve is closed. The previously described sealing groove 63 in the seat and the sealing groove 82 in the gates cooperate to provide a sealing groove surrounding the sealing plate area of the gate and surrounding the port 71 of each seat when the valve is closed. Sealing material can flow under pressure through port 81 of each seat to the partial sealing groove 82 at each side of the gate and thence in both directions from each groove 82 to one of the partial grooves 63 in the seats. The partial grooves 82, 63 overlap end-to-end at opposite sides of passages 11, 12, at each side of the gate. This sealing groove arrangement is not shown in detail in the drawings, but is common in the art and several arrangements thereof will be known to skilled practitioners.

Each sealant's reservoir space may be filled from the exterior of the valve through a port 83 extending laterally through the valve body. At its outer end, the port 83 is provided with a suitable injection fitting (not shown) to which a lubricant injection gun may be attached. When each of the lubricant or sealant spaces 80 at each of the two seats 70 of the valve are filled with sealing material, the sealing material in the reservoir spaces will provide a seal around the seats in the valve body seat recesses. Thus, with the sealant reservoirs thus positioned, no separate seals need be provided around the seat members. The reservoirs act as such seals.

By means of a suitable injection gun connected at the outer end of the port 83, sealant may be injected into either of the reservoir spaces 80 under higher than normal pressure to urge the corresponding seat member 70 toward the gate and at the same time cause sealant flow to the sealing grooves at the higher pressure. In case sealing difficulties are encountered, this procedure may be utilized to insure that adequate seals are formed.

As is evident, the two Belleville springs 77, each biases one of the seats 70 toward the gate member 55, and it has been found that only a relatively small movement of each seat is necessary within the type of reservoir herein provided to supply adequate sealing material capacity for the sealing grooves 63, 82. It has been customary in valves which are sealed by pressure-responsive injection of sealing material into grooves at the seat and gate faces, to provide reservoirs of cylindrical type in the valve body or in the seat member in the valve chamber, which construction of valves has resulted in unnecessary weight and size of the valves. The structure which has been described will enable the making of valves of considerably reduced size and weight.

For illustrating the operation of the valve, and assuming for purposes of exemplifying the operation, a relatively higher fluid pressure in flow line 11 and a relatively smaller fluid pressure in flow line 12 of the valve. The higher pressure in passage 11 will slightly unseat the gate 55 toward the seat at the passage 12 side of the valve so that a downstream seal is formed. The higher pressure acting against the gate will compress the sealing material in the reservoir 80 at the passage 12 side of the valve and cause flow of such sealant through the passage 81 into the sealing grooves 63, 82. The pressure on the sealant in the reservoir will be equal to the differential pressure across the gate times the area surrounded by the seal at the gate-seat interface divided by the end area of the reservoir side formed by the intermediate portion 73 of the seat. In other words, the differential pressure across the gate will act only on the part of the seat which is exposed to the lower pressure at the downstream side of the valve and the sealing material in the reservoir will be subjected to the force imparted by this action on the small seat end.

Referring now to another embodiment of automatic sealing valve according to this invention, shown in FIGURE 3, in the valve 100 the body 11 has been modified. Insert 101 is press-fitted into recess 102 and is tightly received therein. The ring 101 may be omitted and the seal ring to be described inserted directly into a groove or recess of the body itself. Ring 101 is adjacent injection port 83. In ring 101, there is a groove or recess 106 into which is received a ring 107 of elastomeric or other rubber-like material. One side of ring 107 protrudes at 108 from recess 106. Flowable sealing material or other pressuring hydraulic fluid is placed in space 110 of recess 106 to urge ring 107 outwardly from the recess and against the gate 55, by injection thereof through port 83.

As heretofore stated, ring 107 is elastomeric or rubberlike in composition. Preferably, ring 107 is of hard rubber having little elastic property. Grooves 106 extend completely around each flow passage 11, 12 of the valve. It is apparent that ring 107 may be replaced by the same or different type of ring. It is also apparent that should steel ring 101 become worn or damaged, or otherwise incapable of carrying out its function, then ring 101, if employed in the valve, may be replaced.

A notable feature of this modification of the invention is that should a seal not be readily obtained between ring 107 and the gate 55, then an injection gun (not shown) may be applied to the outer end of port 83 and very high pressure fluid injected behind ring 107 to urge it more forceably against the gate. Pressures of 10,000 or 12,000 pounds per square inch, or more, may be thus applied to the sealing ring 107. With pressures such as these, a seal will invariably be attained.

Ring 107 is of relatively great axial width. Thus, ring 107 may progressively be forced out of recess 106 over its width to provide a sealing ring having a long period of life. As the outer edge of ring 107 against the gate or other closure is worn away, the ring is further driven from recess 106 by injection of fluid, and its useability sustained in this manner.

The pressure by which ring 107 is driven against the gate is susceptible to predetermination or modification by varying the width of the ring and of groove 106 in which it is disposed.

The gate grooves 63 are omitted in the FIGURE 3 form of valve.

Referring now to FIGURE 2 of the drawings, in the embodiment or modification therein shown of a valve 200, body 11 is modified to include a recess or counterbore 201 around the inner end of each passage 11, 12, the modification being shown only at the passage 12 side of the valve and the passage 11 side being modified in the same way.

An insert ring 204 is press fitted or otherwise disposed against movement in the inner end of recess 201, and extends only partway of the axial length of the recess and has an internal diameter intermediate the radial depth of the recess. A ring-shaped seat 205 has its outer end flange formation 206 sealingly but slidably engaged with the wall of recess 201 at an O-ring seal 207 in a suitable circular groove therearound. A portion of its side inwardly of flange 206 sealingly yet slidably engages the interior of ring 104, the seal being provided by O-ring seal 210 in a circular groove around the interior opening of ring 204. L-shaped port 211 communicates between the gate contacting end of seat 205 and the sealant reservoir space 214 between ring 204 and flange part 206 of seat 205, the reservoir space 214 communicates with sealant injection port 83 through body 11 from the body exterior, there being an injection fitting at the exterior end of ports 83 as before.

Differential pressure across gate 55 acts on the annular end area of seat 205 corresponding to its annular cross-sectional area radially adjacent ring 204, and this force is transmitted by the seat to the sealant in space 214 over the annular cross-sectional area of the space. However, it will be realized that the differential pressure is exerted only at the upstream side of the valve, so that the FIGURE 2 valve is an "upstream" sealing valve rather than a "downstream" sealing valve as in the case of the valve of FIGURE 1. So in the FIGURE 1 valve, the gate-seal is formed at the low pressure seat, and in the FIGURE 2 valve, the gate-seat seal is formed at the high pressure seat.

Referring now to FIGURE 4 of the drawings, there is shown a modified form of the sealing arrangement shown in FIGURE 3. Parts found in both FIGURES 3 and 4 are identified by the same reference numerals in each. In FIGURE 4, seat element 101a, which corresponds with element 101 of FIGURE 3, does not extend all of the way into recess 102, and is loosely fitted therein instead of being tightly press fitted in the recess. A Belleville spring 220 is disposed under compression between the end of seat 101a and the end of the recess to bias the seat toward the valve chamber and gate 55. A sealing groove 221 around the seat member communicates with the inner end of port 83, which is not seen in FIGURE 4. A port 222 through the seat communicates between groove 221 and reservoir space 106. O-ring seals 225, 226 surround seat 101a, one to each side of groove 221. This modification is "upstream" sealing, since at the side of the valve under higher line fluid pressure, the seat end exposed to such pressure will be acted upon thereby to urge the seat toward the gate. Sealant in space 106 will again urge ring 107 to contact the gate at its end 108.

Referring to FIGURE 5, there is shown a modification of the showing of FIGURE 1, and like parts are designated by like reference numerals in both drawing figures. In FIGURE 5, port 81a and groove 81b around the seat end replace port 81 of FIGURE 1. Seal ring 107 of elastomeric material is disposed in groove 81b to sealingly engage the gate. The sealing grooves 63, 82 are omitted.

While preferred embodiments of the invention have been shown and described, many modifications thereof may be made by a person skilled in the art without departing from the spirit of the invention, and it is intended to protect by Letters Patent all forms of the invention falling within the scope of the following claims:

I claim:
1. In a gate valve including a valve body having a chamber therewithin and a flow passage therethrough intersecting said chamber, removable seat means surrounding said flow passage at opposite sides of said chamber and each movable axially of said flow passage, reciprocal gate closure means in said chamber for closing said flow passage at said seat means at opposite sides of said chamber, and internal sealing means for forming seals between said gate closure means and each of said seat means when supplied with fluid sealant under pressure, the improvement comprising annular sealant reservoirs for said fluid sealant disposed inside of said body and each surrounding said flow passage at one side of said chamber, each said reservoir comprising an annular space between said body and one of said seat means, seal means between said body and one of said seat means at opposite sides of each said reservoir each permitting relatively free movement of the seat means axially of said flow passage, a supply of fluid sealant confined within each said reservoir, each said seat means serving as movable force transfer means to cause pressuring of said sealant in one said reservoir upon movement of the seat means axially of said flow passage to pressure energize said seal between said gate closure means and the seat means.

2. Combination of claim 1, each said seat means engaging said closure means at a surface thereof facing in one direction and exposed to the sealant in one said reservoir at another surface thereof facing in the opposite direction.

3. Combination of claim 1, each said seat means engaging said closure means at a surface thereof facing in one direction and exposed to the sealant in one said reservoir at another surface thereof facing in said one direction.

4. Combination of claim 1, each said seat means including an annular ring of elastomeric material engaging said closure means at one surface thereof and exposed to the sealant in one said reservoir at another surface thereof, whereby sealant pressure urges said ring elastically against said closure means.

References Cited by the Examiner
UNITED STATES PATENTS

| | | | |
|---|---|---|---|
| 2,570,413 | 10/51 | Volpin | 137—246.12 |
| 2,747,600 | 5/56 | Laurent | 137—246.22 |
| 2,796,230 | 6/57 | Grove et al. | 251—328 XR |
| 3,078,865 | 2/63 | Estes et al. | 137—246.12 XR |
| 3,123,078 | 3/64 | Brooks | 137—246.22 |

ISADOR WEIL, *Primary Examiner.*
M. CARY NELSON, *Examiner.*